United States Patent
Laroque et al.

(10) Patent No.: US 6,970,456 B1
(45) Date of Patent: Nov. 29, 2005

(54) METHOD OF MONITORING THE USE OF A CHARGEABLE DYNAMIC SIGNALING PORT OF AN INTER-EXCHANGE TRUNK

(75) Inventors: Christian Laroque, Rueil Malmaison (FR); Lahcen Bennai, Argenteuil (FR)

(73) Assignee: Alcatel, Paris (FR)

( * ) Notice: Subject to any disclaimer, the term of this patent is extended or adjusted under 35 U.S.C. 154(b) by 764 days.

(21) Appl. No.: 09/605,881

(22) Filed: Jun. 29, 2000
(Under 37 CFR 1.47)

(30) Foreign Application Priority Data

Jul. 1, 1999 (FR) ................................. 99 08499

(51) Int. Cl.⁷ ................................................ H04J 3/12
(52) U.S. Cl. ...................... 370/377; 370/419; 370/469; 370/522; 379/93.05; 379/100.04; 379/114.01; 379/219
(58) Field of Search ................................ 370/241, 242, 370/252, 376, 377, 419–421, 469, 522, 524, 370/114.01–114.05, 114.21–114.29, 115.01, 370/429; 379/93.05–93.09, 219–221, 229–230, 379/88.17, 100.04, 114.01, 114.21–114.22, 379/115.01

(56) References Cited

U.S. PATENT DOCUMENTS

| | | | |
|---|---|---|---|
| 4,775,975 A * | 10/1988 | Cromwell et al. | 370/377 |
| 5,311,576 A * | 5/1994 | Brunson et al. | 379/88.26 |
| 5,483,527 A * | 1/1996 | Doshi et al. | 370/399 |
| 5,568,475 A * | 10/1996 | Doshi et al. | 370/399 |
| 6,009,093 A * | 12/1999 | Choe | 370/376 |
| 6,034,972 A * | 3/2000 | Ward et al. | 370/522 |
| 6,320,952 B1 * | 11/2001 | Bruno et al. | 379/211.02 |
| 6,335,938 B1 * | 1/2002 | Chiang et al. | 370/458 |
| 6,463,259 B1 * | 10/2002 | Kim | 455/3.01 |
| 6,467,055 B1 * | 10/2002 | Katuszonek | 714/43 |
| 6,498,843 B1 * | 12/2002 | Cox | 379/207.02 |
| 6,526,043 B1 * | 2/2003 | Fogelholm et al. | 370/352 |
| 2002/0126678 A1 * | 9/2002 | Kelly et al. | 370/401 |
| 2004/0240433 A1 * | 12/2004 | Lobig | 370/352 |

FOREIGN PATENT DOCUMENTS

| | | |
|---|---|---|
| EP | 0 605 3498 A2 | 7/1994 |
| EP | 0 891 115 A1 | 1/1999 |
| WO | WO 98/17079 A | 4/1998 |

* cited by examiner

*Primary Examiner*—Steven Nguyen
*Assistant Examiner*—Roberta Shand
(74) *Attorney, Agent, or Firm*—Sughrue Mion, PLLC

(57) ABSTRACT

To monitor the use of a chargeable dynamic signaling port of a trunk connecting two exchanges, in particular in connection with applications which communicate via exchanges and which are likely to require to use such ports, rights of use are assigned to each application enabling it either to have a port of this kind set up and then to use it, or only to use a port of this kind if it has already been set up.

2 Claims, 1 Drawing Sheet

METHOD OF MONITORING THE USE OF A CHARGEABLE DYNAMIC SIGNALING PORT OF AN INTER-EXCHANGE TRUNK

BACKGROUND OF THE INVENTION

1. Field of the Invention

The invention relates to a method of monitoring the use of a chargeable dynamic signaling port of a trunk connecting exchanges in a telecommunications network.

2. Description of the Prior Art

The introduction of trunks connecting exchanges which have at least one chargeable dynamic signaling port leads to the need to be able to monitor the use of such ports so that those paying for their use can control their costs. This was not the case previously, when the trunks between exchanges were systematically kept active, when they were in service, as was the case in particular in older synchronous time-division switching networks.

It has therefore become necessary to be able to monitor the use of such chargeable dynamic ports to prevent them being set up and used by applications, for example periodic maintenance or management applications, for non-urgent transmissions, possibly at low bit rates. Using ports set up in this way can hardly be economic.

SUMMARY OF THE INVENTION

The invention therefore proposes a method of monitoring the use of a chargeable dynamic signaling port of a trunk connecting two exchanges, in particular in connection with applications which communicate via exchanges and which are likely to require to use such ports, in which method there is provision for assigning rights of use to each application enabling it either to have a port of this kind set up and then to use it or only to use a port of this kind if it has already been set up.

According to one feature of the method according to the invention there is provision for immediately informing applications likely to require to use a chargeable dynamic signaling port that a port of this kind has been set up to enable said applications to use said port as fully as possible.

According to one feature of the method according to the invention the right assigned to an application is monitored in the exchange initiating a call request to set up a call via a chargeable dynamic signaling port of this kind and the same application possibly has a different right according to the exchange from which the setting up of a call is initiated.

According to one feature of the method according to the invention there is provision for assigning rights of use in time periods that can be changed.

The invention, its features and its advantages are explained in the following description, which is given with reference to the drawings listed below.

DETAILED DESCRIPTION OF THE PREFERRED EMBODIMENT

Figure 1:
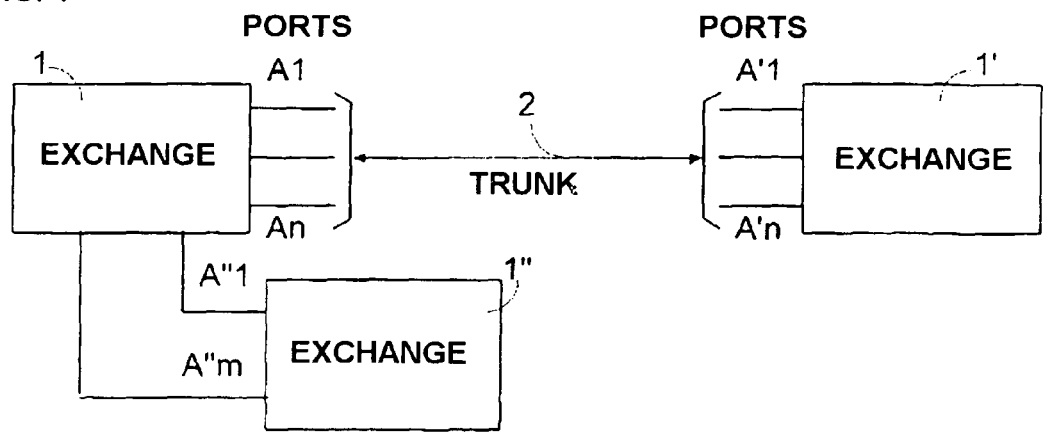
FIG. 1 is a block diagram of a telecommunications network structure with two exchanges.

The method according to the invention of monitoring the use of ports is intended to be applied in the situation of a telecommunications network in which at least two exchanges, such as the two exchanges 1 and 1' shown diagrammatically in FIG. 1, are connected by a trunk 2 which has ports at least some of which are of the chargeable and dynamic signaling type, such as the ports A1 and A'1, for example. Chargeable and dynamic signaling ports can be set up and deactivated on demand and as required. This is known in the art. In the context of the trunk 2, they can coexist with other ports which are set up permanently when they first enter service.

As a general rule the ports of the trunk 2 are used to set up calls, in particular voice and/or data calls, and to transmit signaling via circuits which constitute the trunk. Those circuits can be operated differently and possibly of different kinds. This is known in the art. Each exchange is assumed to have corresponding dedicated ports. In particular, it is usual for transmissions to be effected via the trunk 2 from one of the exchanges 1 or 1' or possibly from and/or to another exchange such as the exchange 1", for particular applications. Those applications can correspond to satisfying requirements specific to at least some users, for example a manager-secretary type application, periodic transmission of large volumes of data, etc. They can also correspond to tasks to be carried out which are specific to the network, for example user terminal supervision, call charging, operator terminal management, etc.

In the context of the method according to the invention, there is provision for assigning a right of use to each of the applications which may need to use a chargeable dynamic signaling port to communicate via a path using the trunk 2 and possibly via a chargeable dynamic signaling port of that trunk. For example, a path of this kind can be set up from a port 1*m* of the exchange 1" and via the two exchanges 1, 1' and the trunk 2 using the chargeable dynamic signaling port A1.

This right of use is assigned by an authority responsible for supervising the management of the exchanges. If necessary, the right in respect of a port can be assigned to only one of the two exchanges connected by the trunk. It can also be different for the same application, according to the exchange at which a request to use the port is formulated. In this example, and as shown diagrammatically in FIG. 2, the rights of use assigned to the applications are stored in a database. They are preferably stored in the exchange(s) through which an application can initiate a call request to set up a call via a path using a chargeable dynamic signaling port.

The rights assigned to each application to use one or more chargeable dynamic signaling ports are stored in a database 3 which is accessible by the exchange(s) concerned. In a preferred embodiment of the invention a database 3 of this kind is individually associated with or integrated into each exchange and holds the data relating to the rights of the applications which can attempt to use an outgoing chargeable dynamic signaling port from the individually associated exchange.

In this example, an application can be authorized to use a chargeable dynamic signaling port for calls that it wishes to set up via the trunk from one or both of the two exchanges connected by the trunk, or not. There is provision for assigning rights to use a chargeable dynamic signaling port which can differ according to the application, one of these rights enabling setting up and use of a chargeable dynamic signaling port, for example, and another right allowing a port of this kind to be used only if it has already been set up.

There is also provision for the setting up of a chargeable dynamic signaling port by an authorized application to lead to the creation of data to be communicated to applications which can then use their right to use a chargeable dynamic signaling port already set up at one or possibly both exchanges. There is also provision for this data to be used by applications waiting to transmit data via a port of this kind to ensure as complete as possible use of the traffic capabilities offered by the port during the time for which the port remains active. A chargeable dynamic signaling port remaining active is of course conditional on the existence of traffic via that port and the port is rendered inactive as soon as possible, with a delay for returning to the inactive state which can vary as a function of the application(s) which most recently use the port to transmit data.

Figure 2:
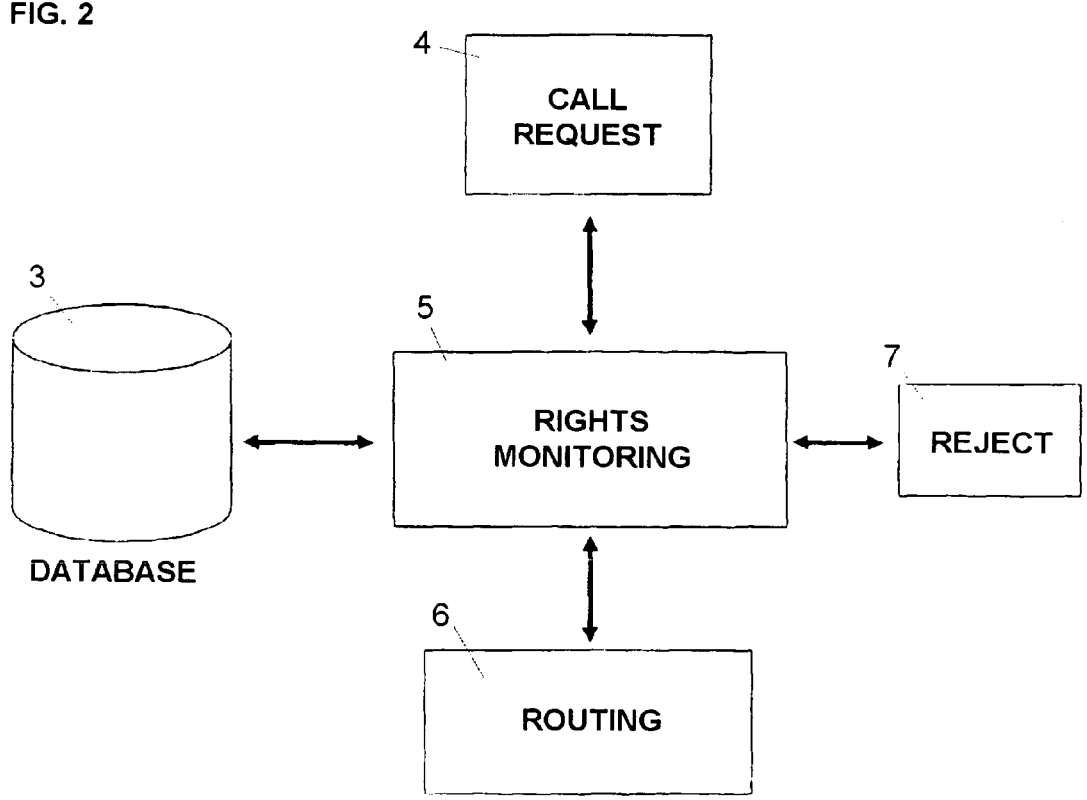
FIG. 2 is a block diagram of a port monitoring system as used by the monitoring method of the invention.

As symbolized in FIG. 2, the method according to the invention is used at the time of each call request 4 to set up a call via a chargeable dynamic signaling port at the exchange 1, 1' or 1" initiating the call request. An access right monitoring process 5 is then undertaken in that exchange as a function of the calling application and the call request is routed (6) via the intended chargeable dynamic signaling port, or not, according to the right assigned to the application, as stored in the database 3 for the exchange. Rejection (7) of a call set up request by the access right monitoring process 5 then leads either to the application having to wait, if it only has the right to use a chargeable dynamic signaling port already set up, or by routing of the waiting application to a different port.

Finally, there is also provision for the right of use assigned to an application to be subject to a time condition and therefore to be usable by the application only within a predetermined time period, in order to limit costs and/or regulate traffic. The right of the application(s) concerned is then restricted or cancelled outside the time periods for it.

What is claimed is:

1. A method of monitoring the use of a chargeable dynamic signaling port of a trunk connecting two exchanges, wherein applications communicate via said exchanges and use said port, said method comprising:

assigning rights of use, of a chargeable dynamic signaling port of a trunk connecting two exchanges, to an application, wherein said chargeable dynamic signaling port is set up and deactivated on demand; and if said chargeable dynamic signaling port has not been activated or has been deactivated, setting up an assigned chargeable dynamic signaling port, of said trunk connecting two exchanges, for use by said application, or if said chargeable dynamic signaling port has already been set up, making an assigned chargeable dynamic signaling port available for immediate use only by said application;

wherein the right assigned to an application is monitored, in an exchange initiating a call request, to set up a call via said chargeable dynamic signaling port, and wherein the same application has a different right according to the exchange from which the setting up of a call is initiated.

2. The method claimed in claim 1, wherein the right assigned to each application is stored in a data base for the exchange initiating the call request.

* * * * *